United States Patent [19]

Shipman et al.

[11] 4,173,503
[45] Nov. 6, 1979

[54] METHOD OF MAKING A RADIAL TIRE

[75] Inventors: James J. Shipman, Akron; Robert W. Hallman, Medina; Linwood P. Tenney; Leman G. Beall, Jr., both of Hudson, all of Ohio

[73] Assignee: The B. F. Goodrich Company, Akron, Ohio

[21] Appl. No.: 910,803

[22] Filed: May 30, 1978

[51] Int. Cl.² ............................................ B29H 17/14
[52] U.S. Cl. ............................ 156/123 R; 156/128 N; 156/289
[58] Field of Search ............... 156/110 R, 123 R, 126, 156/127, 128, 129, 130, 131, 132, 133, 289

[56] References Cited

U.S. PATENT DOCUMENTS

| 1,871,438 | 8/1932 | Abbott | 156/128 |
| 3,373,066 | 3/1968 | Hindin | 156/128 |
| 3,374,131 | 3/1968 | Gough | 156/133 |
| 3,916,969 | 11/1975 | Auerbach et al. | 156/128 R X |
| 4,069,376 | 1/1978 | Minchak | 526/137 |

FOREIGN PATENT DOCUMENTS

| 1017776 | 4/1958 | Fed. Rep. of Germany | 156/128 I |
| 64/3565 | 7/1964 | South Africa. | |

Primary Examiner—John E. Kittle
Attorney, Agent, or Firm—W. A. Shira, Jr.

[57] ABSTRACT

A method of single stage construction of pneumatic tires of the radial type wherein all components are entirely assembled upon a cylindrical tire building drum and thereafter shaped to toroidal configuration with the requisite relative motion between components during shaping being facilitated by a lubricant, characterized in that the lubricant is contained in a composition including a thermoplastic with the composition applied to certain of the tire components in liquid form and dried prior to assembly of the components into the tire.

15 Claims, 4 Drawing Figures

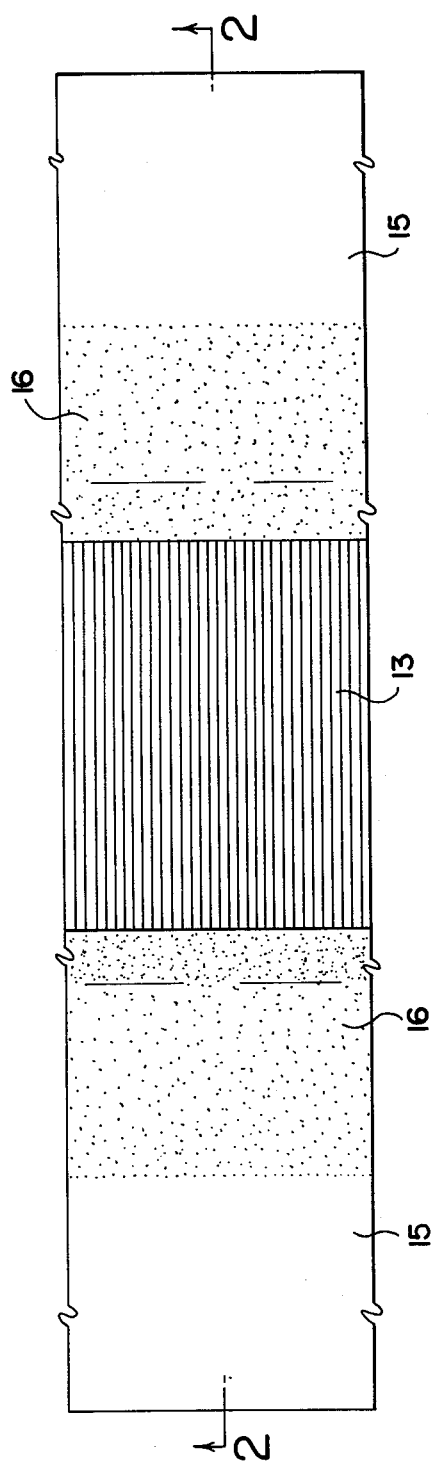
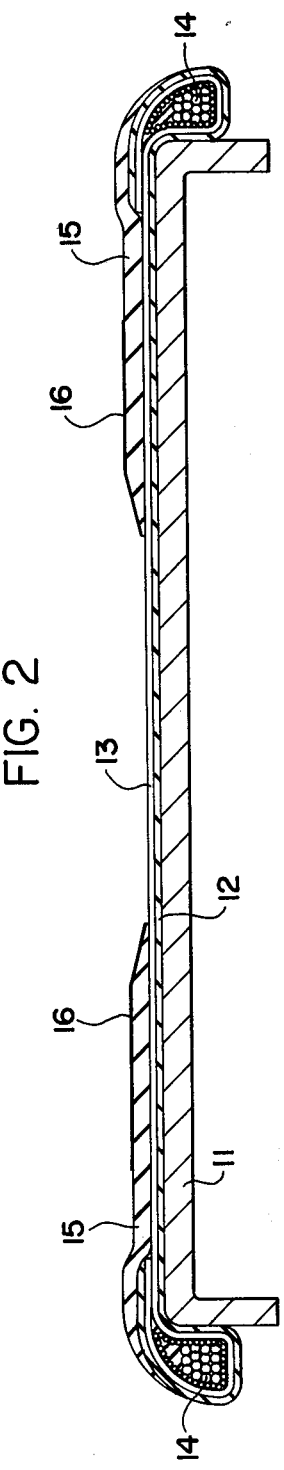

METHOD OF MAKING A RADIAL TIRE

BACKGROUND OF THE INVENTION

Pneumatic tires of the radial type comprise one or more plies of carcass reinforcing cords which extend from bead to bead in planes that contain the axis of the tire, or make a small angle therewith, and extend in a radial direction. The crown of the tire is provided with one or more belt plies, the cords of which extend at small bias angles relative to the circumferential center line of the tire. The large difference of angularity between the carcass reinforcing cords and the cords of the belt plies has generally required that these components be applied in two separate stages. Thus, the carcass ply or plies are assembled with bead cores in a first stage upon a generally cylindrical tire building drum after which the carcass is removed from the drum. In the second stage the cylindrical carcass is shaped to a generally toroidal configuration upon which the belt plies are applied, followed by the rubber which is to form the tread of the completed tire.

Efforts have been made heretofore to assemble radial tires completely in one stage upon a cylindrical tire building drum by providing a lubricant between those components of the tire which partake of the largest movements relative to each other during the shaping operation. Such lubricants have generally been provided in powdered or liquid form to select areas of the components during the tire building or assembling operation with other areas remaining untreated so that the assembled materials will adhere sufficiently for handling, while permitting the required relative movement during shaping. In such prior operations it has been difficult to properly control the application of the lubricant. This has resulted in high percentages of defective product as well as loss of time in cleaning the tire building apparatus to remove excess lubricant. Nevertheless, there has been a continuing need for achieving one stage building of radial tires in order to reduce labor costs, increase output of existing equipment, and eliminate the need for specialized additional equipment required when two stage building of the tires is employed.

SUMMARY OF THE INVENTION

This invention provides an improved method for building radial tires in one stage without the need for employing lubricant materials in powdered or liquid form during the tire building operation, thereby eliminating improper application of lubricant to portions of the tire which should not receive it as well as eliminating contamination of the building equipment and the environment in which it is located. These and other advantages of the invention are achieved by providing those components of the tire which require lubricating, to facilitate shaping of the tire to toroidal configuration, with a friction reducing substance prior to their delivery to the tire building operation, with the friction reducing substance being such that it is in dry, non-powder form at the time the components are assembled in the tire building operation.

More specifically, the invention comprises the method of making radial tires in one stage, wherein all the components of the tire including the carcass, belt, and rubber cover material are assembled sequentially upon a cylindrical tire building drum with the rubber material forming the sidewall cover of the completed tire having axially spaced portions thereof overlaid by marginal portions of the belt of the tire, the method being characterized by coating the said spaced portions of the sidewall cover prior to placement thereof on the building drum with a composition comprising a thermoplastic, a solvent for the thermoplastic and a material which is a lubricant for rubber, with the said coating being dried before the sidewall cover is placed on the carcass. In the event additional reduction of friction between the sidewall cover and the belt is desired the axially outer marginal portions of the radially inner surface of the belt material may be similarly coated.

Preferably, the lubricant is at least one of the group consisting of stearic acid, zinc stearate, stearamide, and paraffin wax, while the thermoplastic is selected from the group comprising trans-1,4-polyisoprene and copolymers of dicyclopentadiene and/or at least one alkylnorbornene, together with a minor amount of at least one acrylic olefin. The solvent may be one, or a mixture of two or more, of toluene, xylene, cyclohexane, gasoline, benzene and kerosene, and the composition may also include one of the group consisting of carbon black and silica.

BRIEF DESCRIPTION OF THE DRAWINGS

FIG. 1 is a fragmentary plan view of a tire carcass being assembled on a cylindrical tire-building drum with a portion of the rubber, normally covering the cords of the carcass, being removed;

FIG. 2 is a fragmentary transverse sectional view taken on the section indicating line 2—2 of FIG. 1;

DETAILED DESCRIPTION

Figure 3:
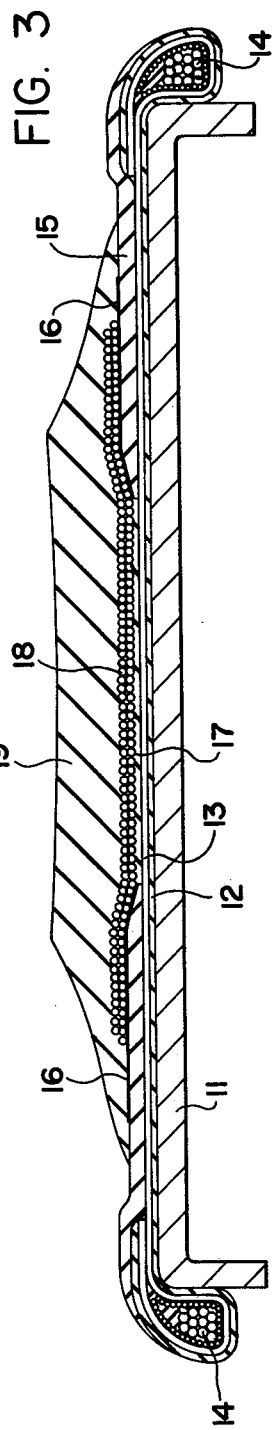
FIG. 3 is a view similar to FIG. 2 but showing the addition of belt plies and the rubber for forming the tread of the tire; and, FIG. 4 is a fragmentary transverse view through a shaped and cured tire made in accordance with this invention.

The invention provides a method by which radial type pneumatic tires may be built in one stage upon a cylindrical tire building drum. The invention is illustrated in the accompanying drawing and will be described with reference to the manner in which it is employed to produce a tire 10 of the type suitable for highway use upon a passenger vehicle. It is to be understood, however, that the invention can be employed in building radial tires for other types of vehicles and uses.

The tire building drum 11 which is employed is conventional and hence, is not illustrated or described in detail. Such a drum, as is well known, is mounted for rotation about a horizontal axis and generally comprises several segments that can be moved relative to each other to facilitate removal therefrom, in the generally cylindrical form, of an uncured tire that has been assembled thereon by sequential application of appropriate components.

As shown in FIGS. 1 and 2, which illustrate the presently preferred embodiment of the invention, the tire 10 is built by applying to the drum 11, one or more strips 12 of rubber covered cords 13, which strips are known as ply stock and are disposed upon the building drum 11 in the form of an annulus, the edges of which project beyond the ends of the drum 11. Annular reinforcements 14, commonly known as bead cores, are applied over the edges of the ply strip or strips 12 and the edges of the latter turned about the bead cores which may also include appropriate filler strips and/or flippers. The resulting composite, commonly known as a carcass, has the reinforcing cords 13 disposed so as to extend generally parallel to the axis of the drum so that they will be in essentially radial planes of the completed tire. This location of the cords is illustrated in FIG. 1 of the drawing, by removal of a portion of the rubber covering from the cords 13.

Rubber to comprise the sidewall cover in the completed tire is next applied to the drum. This rubber may be a strip of sufficient width to form the cover for both sidewalls with a thin connecting web therebetween. However, in the presently preferred embodiment two axially spaced strips 15 are employed, each of width to extend from the respective bead region of the tire to a location adjacent to the proximate shoulder of the completed tire. Hence, the strips 15 are axially spaced from each other on either side of the circumference mid plane of the tire, as is clearly indicated in FIGS. 1 and 2. The portions of the sidewall cover in the vicinity of the shoulders of the completed tire 10 are, in accordance with this invention, provided with a coating 16, as indicated in the strippled areas on the strips 15 in FIG. 1. This coating provides a low friction surface for rubber and for the wire or other reinforcement material employed in the belt of the tire.

Following application of the strips 15, construction of the tire 10 is completed by disposing upon the previously assembled portions of the tire plies of cord-reinforced rubber to provide a restrictive belt, and a strip of rubber which will form the tread or running surface of the completed tire. In the embodiment shown, the belt comprises two plies or layers 17 and 18, of wire cables with each ply having the cables therein extending parallel to each other and at a small bias angle relative to the circumferential center line of the tire. The cables of the ply 17 are at an equal but opposite angle with respect to the cables in ply 18. The plies 17 and 18 will have a width greater than the width of these components in the completed tire and the angles of their cables relative to the circumferential center line will be greater than in the completed tire. As indicated in the drawings, the width of the plies 17 and 18 is such that these plies extend over the coating 16 on the margins of the strips 15 while the tire is being assembled on the building drum. The strip of rubber 19 which is to form the tread of the completed tire may, as is shown in FIG. 3, have the outer edges tapered. These edges overlie the edges of the belt plies 17 and 18 and a portion of the coating 16 on the sidewall strips 15.

Figure 4:
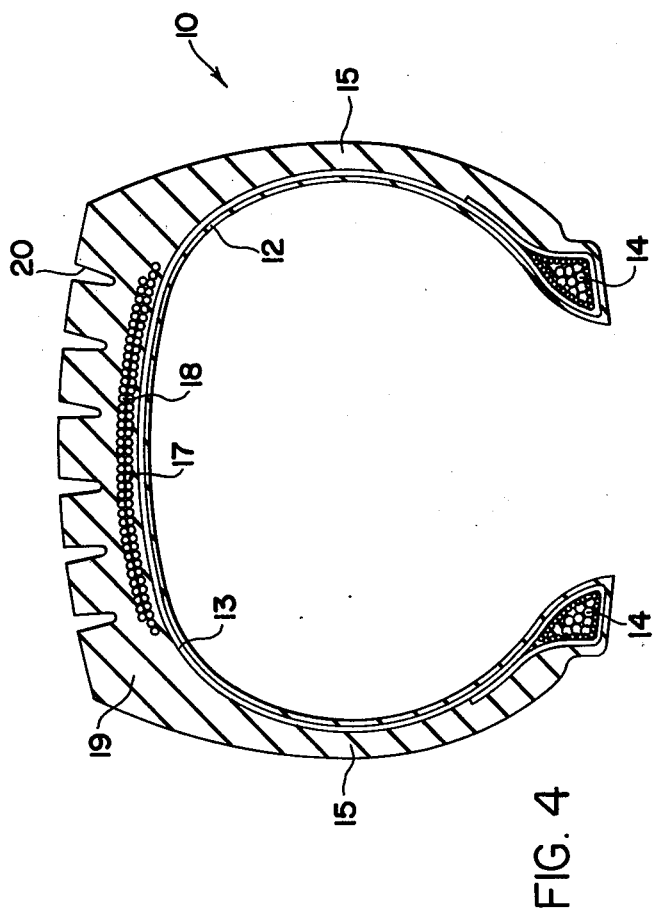

An uncured tire constructed in accordance with this invention is removed as a unit from the building drum 11 while in the generally cylindrical configuration in which it was assembled. This uncured tire is then transferred to conventional tire vulcanizing equipment in which the tire is shaped to the generally toroidal configuration and cured with the application of heat and pressure. The completed tire than has the conventional form as shown in FIG. 4 with an anti-skid pattern 20 that is formed during the vulcanization.

During the shaping operation the belt plies 17 and 18 and a portion of the tread rubber 19 move relative to the underlying sidewall strips 15, since the crown of the tire is increased in diameter, as the bead regions are moved toward each other and the tire is given its generally toroidal configuration. As a result of this movement of the components, the width of the tread strip 19 and the belt plies 17 and 18, as well as the cord angles of the latter, are decreased as is well understood in the art.

This is rendered possible by the friction reducing coating 16 on the sidewall strips 15 which permits relative movement of the parts so that the cables 13 of the belt plies and other components of the tire are not distorted by the shaping operation.

The coating 16 for the sidewall strips 15, which makes possible the one stage building of the tire in cylindrical flat band form and subsequent shaping to toroidal configuration without undesirable distortion of the components, is applied to the strips 15 in liquid form as a part of the stock preparation. This coating is dried upon the strips before they are employed in the building operation so that there is no need to provide rubber lubricant spraying or dusting equipment at the tire building machine. As a result, the necessary coating can be provided upon the proper areas of the tire components and in proper quantities without contamination of the tire building equipment or improper application of the friction reducing material to areas which should not receive that material but should retain their adhesive or tacky nature to facilitate the tire building operation.

The friction reducing material that forms the coating 16 is a composition comprising a thermoplastic dissolved in a solvent to which is added a substance which is a lubricant for rubber when in contact with other rubbery materials or with materials commonly employed as reinforcements therein, such as fibers or cords of metal, textile and glass. In the preferred embodiment the thermoplastic material is selected from the group consisting of trans-1,4-polyisoprene and copolymers of dicyclopentadiene and/or at least one alkylnorbornene, together with a minor amount of at least one acyclic olefin. The acyclic olefin is preferably an acyclic monoolefin or nonconjugated acyclic di-or triolefin which acts as a molecular weight modifier during the preparation of the dicyclopentadiene and/or alkylnorbornene copolymers. If a major amount of dicyclopentadiene is used, then any alkylnorbornene comonomer may be used. If a minor amount of dicyclopentadiene is used, then each alkyl group of an alkylnorbornene comonomer preferably contains from 1 to 5 carbon atoms, more preferably from 1 to 3 carbon atoms. Minor amounts of other monomers such as dihydrodicyclopentadiene, tetracyclododecene, and substituted tetracyclododecenes may also be polymerized in the copolymers. In any case, the copolymers preferably have glass transition temperatures ($T_g$) of at least about 26° C., more preferably from about 30° C. to the tire cure temperature, which typically ranges from about 140° C. to about 180° C.

Examples of suitable copolymers include dicyclopentadiene/1-butene, norbornene/n-1-hexene, 5-methyl-2-norbornene/n-1-hexene, and 5,6-dimethyl-2-norbornene/n-1-hexene. Also suitable are dicyclopentadiene/norbornene/n-1-hexene, dicyclopentadiene/methylnorbornene/n-1-hexene, dicyclopentadiene/dimethylnorbornene/1-pentene, and dimethylnorbornene/dihydrodicyclopentadiene/n-1-hexene. Some thermoplastics of this type and the production thereof are described in U.S. Pat. No. 4,069,376, the teachings of which are incorporated by reference herein. Trans-1,4-polyisoprene may be used instead of the above-mentioned copolymers. The solvent is one, or a mixture of two or more, of toluene, xylene, cyclohexane, gasoline, benzene and kerosene. The lubricant is one, or a mixture of two or more, of the group consisting of stearic acid, zinc stearate, stearamide, and paraffin wax. In addition, to these components the composition may also include carbon black and/or silica, as well as other substances in minor amounts that are commonly employed in elastomer cements.

One suitable formulation for the coating material 16 is as follows:

|  | Parts By Weight |
|---|---|
| Solvent | 130.0 |
| Thermoplastic | 4.0 |
| Stearic Acid | 10.0 |
| Zinc Stearate | 10.0 |
| Carbon Black | 2.0 |
|  | 156.0 |

In the above formulation, thermoplastics which have been found to provide good encapsulation of the lubricants, i.e., the stearic acid and zinc stearate, as well as good cured interface with the rubber of the tire are: copolymer of dicyclopentadiene norbornene; copolymer of dicyclopentadiene and methylnorbornene; polynorborene; polymethylnorbornene; terpolymer of dicyclopentadiene, methylnorbornene and methyltetracyclododecene; and trans-1,4-polyisoprene. The solvent employed, appropriate for the thermoplastic used, was selected from the group heretofore mentioned. In general, a satisfactory thermoplastic should have a cured interface with the rubber of the tire equivalent to that of the rubber to itself.

The following thermoplastics which, although providing good encapsulation of stearic acid and zinc stearate, did not provide good cured interface with the tire and therefore are not suitable for the process of the invention: polystyrene; copolymer of 85 parts styrene and 15 parts butadiene; polyvinylbutyral; polyvinylacetate; polyvinylchloride; and polymethylmethacrylate. Also, unsatisfactory are those substances which, although having a good cured interface with the rubber, exhibited poor resistance to chalking of the lubricant when the composition had dried on the rubber prior to curing. One example of such a substance is a resin made from tertiary butylphenol and acetylene.

Another typical formulation for the coating material 16 is:

|  | Parts By Weight |
|---|---|
| Toluene | 100.00 |
| Dicyclopentadiene/norbornene/ n-hexene-1 copolymer | 4.00 |
| Stearic Acid | 20.00 |
| Carbon Black | 2.00 |
| Zinc Oxide | .02 |
|  | 126.02 |

An additional typical formulation is;

|  | Parts By Weight |
|---|---|
| Toluene | 130.00 |
| Dicyclopentadiene/norbornene/ n-hexene-1 copolymer | 4.00 |
| Carbon Black | 2.00 |
| Zinc Stearate | 25.00 |
|  | 161.00 |

The coating material 16 may be applied to the sidewall strips 15 by spraying, brushing, rolling or other known means. Although only the sidewall strips 15 have been described as coated with the lubricating coating material, the marginal areas of the side of belt ply 17 which contact the sidewall strip may also be coated and dried prior to assembly into the tire. This may prove desirable where the lubricant employed in the formulation is entirely stearic acid. Other marginal regions of components which have considerable relative movement during shaping of the tire may also be coated.

The quantity of the coating should be such as to thoroughly cover the areas which are to have the surface friction reduced but should not be in sufficient quantity or consistency that it will flow into areas where the rubber is to remain uncoated. Preferably, the quantity of lubricant in the composition should be such that upon drying there remains 0.002 to 0.004 grams of the lubricant per square centimeter of the surface coated. The coefficient of friction of the coated surface with respect to uncured ply stock employed for the belts 17 and 18 of the tire should preferably be less than 2.0. Obviously, the value of the coefficient is affected by the smoothness of the materials on which it is applied and those that are in contact therewith as well as by the quantities and specific materials in the composition.

The relative quantities of the individual components of the coating composition can be varied from those in the specific examples dependent upon the particular mode of application and the tire building materials with which the coating composition is employed. Thus, the solvent concentration is not critical and may be adjusted to provide a sufficient fluid consistency for spraying or a thicker consistency for roller or brush application. The lubricating action of the coating is increased as the concentration of lubricant component is increased. However, in order to prevent excessive chalking or rubbing off of the lubricant in handling the coated strips, the concentration of the zinc stearate or other lubricant should not exceed 600 parts by weight for 100 parts by weight of the thermoplastic. The carbon black can be present in quantities of 0 to 100 parts per 100 parts by weight of the thermoplastic without adverse effect upon the coefficient of friction of the coating. Therefore, although specific values have been given for several formulations of the coating composition, it will be understood that the proportions of materials can be varied from those stated in the examples and that other thermoplastics, solvents, and lubricants, which are the equivalents of those recited, can be employed without departing from the invention.

We claim:

1. The method of making in one stage a radial tire for vehicles wherein all the components of the tire including the carcass, belt, and rubber cover material are assembled sequentially upon a cylindrical building drum, with the rubber material forming the sidewall cover of the completed tire having axially spaced portions thereof, overlaid by marginal portions of the belt of the tire; the improvement which comprises coating the said spaced portions of the sidewall cover prior to placement thereof upon the building drum with a composition comprising a thermoplastic, which has a cured interface with the rubber equivalent of the rubber to itself, a solvent for the thermoplastic, and material which is a lubricant for rubber, with the said coating being dried before the sidewall cover is placed upon the carcass.

2. The method as defined in claim 1 wherein the thermoplastic is selected from the group consisting of trans-1,4-polyisoprene and copolymers of dicyclopentadiene and/or at least one alkyl-norbornene, together with a minor amount of at least one acyclic olefin.

3. The method as defined in claim 1 wherein the thermoplastic is a copolymer of dicyclopentadiene and norbornene.

4. The method as defined in claim 2 wherein the coating composition further comprises at least one of the group consisting of carbon black and silica.

5. The method as defined in claim 1 wherein the lubricant is at least one of the group consisting of stearic acid, zinc stearate, stearamide, and paraffin wax.

6. The method as defined in claim 1 wherein the solvent is one, or a mixture of two or more, of toluene, xylene, cyclohexane, gasoline, benzene and kerosene.

7. The method as defined in claim 1 wherein the thermoplastic is selected from the group consisting of trans-1,4-polyisoprene and copolymers of dicyclopentadiene and/or at least one alkyl-norbornene, together with a minor amount of at least one acyclic olefin, and the lubricant is one of the group consisting of stearic acid, zinc stearate, stearamide, and paraffin wax.

8. The method as defined in claim 7 wherein the coating composition further comprises at least one of the group consisting of carbon black and silica.

9. The method of making a radial tire comprising:
(a) assembling upon a cylindrical drum a body layer comprising at least one ply of rubber coated cord fabric with all of the cords in said layer being substantially axially oriented upon the drum;
(b) applying an annulus of reinforcing material over each axially outer edge of the said layer at either end of said drum and turning each of said edges over the respective annulus;
(c) applying externally of said body layer rubber to comprise the sidewall cover of the completed tire with axially spaced portions of the sidewall cover on opposite sides of the circumferential centerline of the drum coated with a dried composition comprising a thermoplastic which exhibits a cured interface with the rubber equivalent of the rubber to itself, and a lubricant for rubber;
(d) applying, externally of the body layer and the said axially spaced portions of the sidewall cover, a belt layer comprised of rubber coated cords with the edges of the belt layer extending over the coated portions of the sidewall cover;
(e) applying rubber externally of said belt layer to constitute the tread portion of the completed tire;
(f) removing the assembled materials as a cylindrical uncured tire from the building drum; and
(g) vulcanizing the uncured tire in a toroidal configuration.

10. The method of making a radial tire comprising:
(a) assembling upon a cylindrical drum a tire carcass including spaced bead cores and at least one ply of rubber coated cords oriented substantially axially upon the drum;
(b) applying upon said carcass a pair of strips of rubber to comprise the sidewalls of the completed tire with the adjacent edges of the strips axially spaced from each other on opposite sides of the circumferential centerline of the drum, the adjacent marginal portions of the outer surfaces of said strips being coated with a dried composition comprising a thermoplastic, which exhibits a cured interface with the rubber equivalent of the rubber to itself, and a lubricant for rubber deposited upon the strips from a solution of the thermoplastic containing the lubricant;
(c) applying externally of the carcass and the said marginal portions of the sidewall strips, a breaker layer comprised of at least two plies of rubber coated cords with the cords extending parallel to each other in each ply and with at least two plies of the belt having the cords disposed at opposite acute angles relative to the circumferential centerline of the drum;
(d) applying rubber externally of said breaker layer to constitute the tread portion of the completed tire;
(e) removing the assembled materials as a cylindrical uncured tire from the building drum; and
(f) shaping the uncured tire to a toroidal configuration and vulcanizing the shaped tire with heat and pressure.

11. The method as defined in claim 10 wherein the lubricant is selected from the group consisting of stearic acid, zinc stearate, stearamide, and paraffin wax.

12. The method as defined in claim 10 wherein the thermoplastic is selected from the group consisting of trans-1,4-polyisoprene and copolymers of dicyclopentadiene and/or at least one alkylnorbornene, together with a minor amount of at least one acyclic olefin.

13. The method as defined in claim 10 wherein the said composition further includes carbon black.

14. The method as defined in claim 10 wherein the thermoplastic is a copolymer of dicyclopentadiene and norbornene.

15. The method as defined in claim 10 wherein the lubricant comprises equal parts of stearic acid and zinc stearate and is present in an amount in the order of five times that of the thermoplastic when measured in parts by weight.

* * * * *